United States Patent [19]

Ackerman et al.

[11] Patent Number: 4,892,374
[45] Date of Patent: Jan. 9, 1990

[54] ARTICLE COMPRISING AN OPTO-ELECTRONIC DEVICE AND AN OPTICAL WAVEGUIDE COUPLED THERETO, AND METHOD OF MAKING THE ARTICLE

[75] Inventors: David A. Ackerman, Hopewell; Louis A. Koszi, Scotch Plains, both of N.J.

[73] Assignee: American Telephone and Telegraph Company, AT&T Bell Laboratories, Murray Hill, N.J.

[21] Appl. No.: 163,689

[22] Filed: Mar. 3, 1988

[51] Int. Cl.$^4$ .............................................. G02B 6/26
[52] U.S. Cl. .............................. 350/96.15; 350/96.11; 350/96.17; 357/19; 372/75
[58] Field of Search ............... 350/96.11, 96.12, 96.15, 350/96.17, 96.18, 96.20; 357/17, 19, 30, 74; 250/227; 372/43, 70, 75

[56] References Cited

U.S. PATENT DOCUMENTS

| | | | |
|---|---|---|---|
| 4,119,363 | 10/1978 | Camlibel et al. | 350/96.20 |
| 4,144,504 | 3/1979 | Leggett et al. | 357/74 X |
| 4,186,994 | 2/1980 | Denkin et al. | 350/96.17 |
| 4,210,923 | 7/1980 | North et al. | 357/30 |
| 4,296,998 | 10/1981 | Duft | 350/96.20 |
| 4,326,771 | 4/1982 | Henry et al. | 350/96.17 |
| 4,349,906 | 9/1982 | Scifres et al. | 357/17 X |
| 4,411,057 | 10/1983 | Duda et al. | 29/569 L |
| 4,466,009 | 8/1984 | Konishi et al. | 357/30 |
| 4,500,165 | 2/1985 | Scholl et al. | 350/96.20 |
| 4,647,331 | 3/1987 | Koury, Jr. et al. | 350/96.18 X |
| 4,729,618 | 3/1988 | Yoshida et al. | 350/96.11 |
| 4,744,626 | 5/1988 | Mery | 350/96.20 |
| 4,760,568 | 7/1988 | Hine | 350/96.11 X |

FOREIGN PATENT DOCUMENTS 57-198678 12/1982 Japan ..................................... 372/75

Primary Examiner—John D. Lee
Attorney, Agent, or Firm—Eugen E. Pacher

[57] ABSTRACT

A method for aligning an opto-electronic device such as a semiconductor laser to a waveguide on a substrate is disclosed. The method comprises placing the device onto the substrate such that it is in rough alignment with the waveguide, optically pumping the device such that the device emits electromagnetic radiation, with some of the emitted radiation being coupled into the waveguide and detected by appropriate means. If indicated by the detector signal, the position of the device is then adjusted until the desired degree of coupling is attained, whereupon the device is mechanically secured to the substrate and appropriate electrical connections made between device and substrate. Devices useful in the practice of the method typically comprise a window in their top metallization layer.

7 Claims, 2 Drawing Sheets

ARTICLE COMPRISING AN OPTO-ELECTRONIC DEVICE AND AN OPTICAL WAVEGUIDE COUPLED THERETO, AND METHOD OF MAKING THE ARTICLE

FIELD OF THE INVENTION

This invention pertains to articles that comprise an opto-electronic device such as a laser, and that furthermore comprise an optical waveguide, e.g., a planar waveguide or an optical fiber, optically coupled to the device. This application also pertains to methods of making such an article.

BACKGROUND OF THE INVENTION

In several fields of technology, for instance, in optical communications and optical sensors, there exists the need to couple an optical device such as a radiation source or a detector to an optical waveguide such as a planar waveguide or an optical fiber.

The prior art methods for making a package comprising a device such as a laser and a fiberguide coupled thereto generally comprise securing the device to a mounting or header such that electrical contact can be established with the device, and actively aligning the fiber with respect to the active area of the device such that the desired degree of optical coupling results. See, for instance, U.S. Pat. Nos. 4,119,363 and 4,296,998. The prior art also knows variations on this general scheme in which features are provided that permit appropriate alignment of an optical fiber relative to the active area of the device without active alignment. Exemplary of these references are U.S. Pat. Nos. 4,326,771 and 4,411,057.

Prior art methods are not well suited for manufacturing packages that comprise a fixed optical waveguide and require precise alignment of the waveguide with the active area of the device. This application discloses such a method.

SUMMARY OF THE INVENTION

In one aspect the invention is a method of manufacturing an article that comprises an opto-electronic device and an optical waveguide, with the device and the waveguide being optically coupled. The method comprises exposing the preliminarily aligned device to electromagnetic pump radiation such that the device is caused to emit electromagnetic radiation (by photoluminescence). This implies that at least the portion of the device between the irradiated surface and the active region of the device is sufficiently transparent to the pump radiation such that an effective amount of pump radiation reaches the active region and is absorbed therein. The method further comprises detecting at least some of the radiation emitted by the device by appropriate means. The method also comprises adjusting (if indicated by the signal from the detection means) the relative position of the device and the waveguide such that a desired degree of optical coupling between the device and the waveguide results. After attainment of the desired degree of coupling the device is secured to the substrate in the coupling position.

In another aspect the invention is an article that comprises an optoelectronic device and an optical waveguide that is optically coupled to the device, wherein the device is a semiconductor device of a type such that optical pumping of the device can result in emission of radiation from the device. The device has an aperture or window in a metalization layer such that pump radiation can be transmitted into the semiconductor body of the device.

DETAILED DESCRIPTION OF SOME PREFERRED EMBODIMENTS

Figure 1:
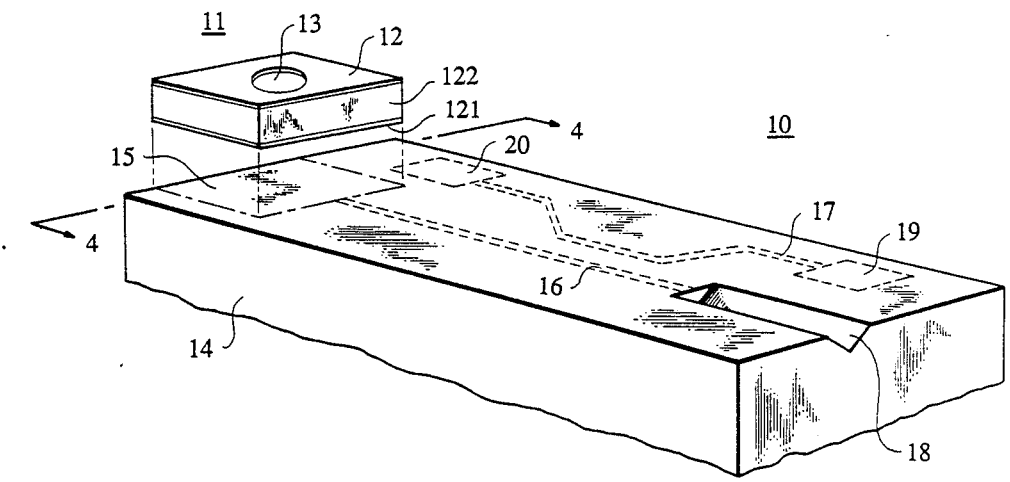
FIG. 1 schematically depicts an exemplary article according to the invention.
Figure 4:
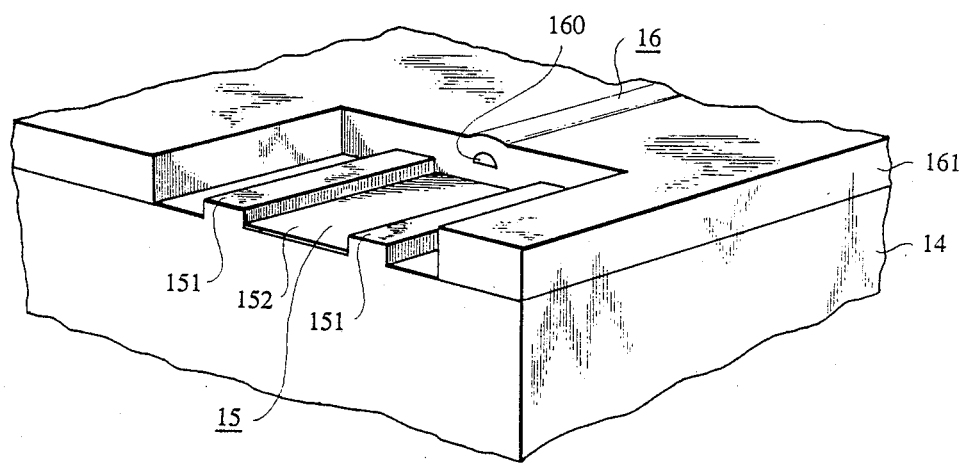
FIG. 4 schematically illustrates an exemplary embodiment of the bonding area of a Si substrate useful in the practice of the inventive method.

FIG. 1 schematically depicts an exemplary article according to the invention (10) comprising a substrate 14 with a planar waveguide 16 thereon. The substrate preferably is Si but can be any other appropriate material such as glass, lithium niobate, or other semiconductor such as GaAs or InP. The waveguide can be conventional but preferably is of the type disclosed in a concurrently filed U.S. patent application ("Device Including a Substrate-Supported Optical Waveguide, and Method of Manufacture"), Ser. No. 163,687, filed Mar. 3, 1988, the disclosure of which is incorporated herein by reference. The substrate also comprises means 18 for securing an optical fiber to the substrate in coupling relationship with the planar waveguide 16. The means 18 are a V-groove etched into the substrate, of the type disclosed in a concurrently filed U.S. patent application ("Device Including a Component in Alignment with a Substrate-Supported Waveguide"), Ser. No. 163,686, filed Mar. 3, 1988, also incorporated herein by reference. The article also comprises a bonding area 15 which can be a planar metalized pad, or which can have a non-planar profile that facilitates bonding of the device to the substrate while maintaining the alignment of the device relative to the fixed waveguide 16. An exemplary embodiment of the bonding area is schematically depicted in FIG. 4. The substrate further comprises a second planar waveguide 17 that is optically coupled to 16, a front face monitor bonding area 19 and a receiver bonding area 20, both indicated schematically only. Both the front face monitor and the receiver are to be mounted on the respective bonding areas such that they are optically coupled to 17. Articles of this type are also disclosed in a concurrently filed U.S. patent application ("Subassemblies for Optoelectronic Hybrid Integrated Circuits"). The substrate serves a function analogous to that of an optical bench, and can be referred to as such.

FIG. 1 also shows schematically semiconductor laser 11 (comprising metallization layers 12 and 121, and semiconductor body 122) which is to be placed onto 15 and electrically connected and mechanically secured thereto in coupling relationship with 16. The laser comprises a window or opening 13 in the metallization layer 12 such that pump radiation can be introduced into the semiconductor body. As will be recognized by those skilled in the art, a substrate such as is shown in FIG. 1 requires means for making electrical contact with all the active devices thereon (e.g., laser, receiver and front face monitor). Such means are conventional and are not shown. Electrical contact to the laser typically is completed by means of a conventional wire bond to the top metallization layer. However, it may also be possible to use a bonding area that comprises two bonding pads that are electrically isolated from each other, together with a laser which has both electrical terminals located on the "bottom" surface.

The front face monitor can serve a dual function, that is, it can be used during alignment of the laser with waveguide 16, and also to monitor the operation of the laser (e.g., the output power). During the former the laser typically will be positioned such that the signal from the monitor is a maximum. Manufacture of an article according to the invention typically also comprises encapsulation of the Si substrate and the components thereon. This encapsulation can be carried out by conventional means. Exemplary encapsulation schemes are, for instance, disclosed in previously referred to U.S. patent application Ser. No. 163,686.

Figure 2:
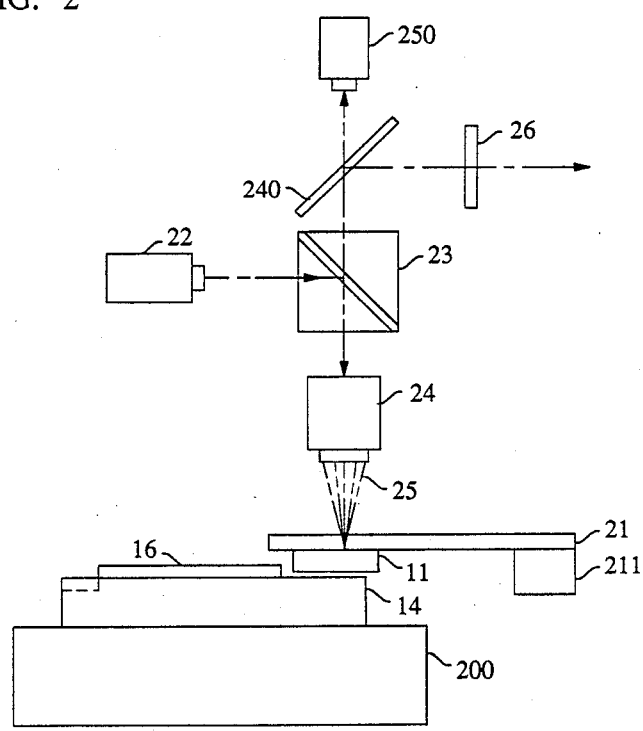
FIG. 2 is a schematic diagram of an exemplary embodiment of the invention.

FIG. 2 schematically depicts an exemplary embodiment of the inventive method. On heater stage 200 is positioned Si substrate 14, the substrate exemplarily being of the design shown in FIG. 1. Semiconductor laser chip 11 is picked up by appropriate means, e.g., a transparent vacuum collet 21, and placed onto the bonding area on the Si chip while still being held by the collet. As will be appreciated by those skilled in the art, the collet is driven by appropriate means 211 to provide the ability for accurate movement (typically, in the x, y and z directions, and possibly also providing for angular movement). Means for accomplishing such movements are well known (e.g., piezoelectric transducers) and are not shown in detail. The initial placement of the device onto the Si substrate may take place under manual or automatic (e.g., microprocessor) control.

After initial placement of the laser, the laser is exposed to appropriate pump radiation, e.g., 1.06 μm radiation from YAG laser 22. The pump beam is redirected by beam splitter 23 and focused by appropriate means (e.g., microscope objective 24) such that the pump beam 25 is directed through the window 13 in the metallization layer of laser 11. The exemplary implementation depicted in FIG. 2 further comprises a beam splitter 240, an IR TV camera 250, and a 1.06 μm filter 26, the latter provided to prevent pump radiation from entering optional observation optics (not shown) and, ultimately, the eye of a (optional) human operator. The output of the TV camera can be used to accomplish automatic initial placement in a manner well known to those skilled in the art.

The pump radiation that enters the semiconductor body of laser 11 causes emission of laser radiation (e.g., 1.3 or 1.5 μm) by photoluminescence. The emitted radiation is used to accomplish final placement of the laser. Typically the initial placement puts the active area of the laser in proximity to the fixed waveguide 16 such that at least some of the emitted radiation is coupled into the waveguide. All or some of the coupled-in radiation is then detected by appropriate means, e.g., a front face monitor or an external detector. The detector output is then used to align the laser such that the desired degree of optical coupling between the laser and the waveguide results. Typically this means that the laser position is adjusted until the detector output is maximum. After the desired coupling has been achieved, the laser is secured to the bonding area by known means, e.g., by a solder bump technique, with the Si substrate heated by means of the heater stage.

As will be appreciated by those skilled in the art, the soldering or other bonding is accomplished such that an electrical connection is established between the downside terminal of the laser chip and a contact pad or other appropriate conductive feature of the carrier chip. Furthermore, in subsequent processing, electrical contact will be established by known means between the topside terminal of the laser chip and a contact pad or the like on the substrate, such that current can be caused to flow through the laser.

FIG. 4 depicts in more detail the bonding area portion of an exemplary substrate. It will be understood that the figure is schematic, and that the various features of the figure are not to scale. (This applies equally also to FIGS. 1, 2 and 3.) The bonding area portion 15 of silicon substrate chip 14 is processed by known means (e.g., photolithography and wet etching) such that two ridge-like features 151 are produced. Onto the recessed region between the two ridges, metal (e.g., Au) layer 152 is deposited. The planar waveguide 16 comprises a relatively high refractive index region 160 embedded in relatively low refractive index matrix 161. The latter typically is $SiO_2$, and the former exemplarily a phosphosilicate glass (P-glass). It will be appreciated that the "height" of 160 above the top surface of 151 typically is chosen to correspond to the distance between the bottom surface of the laser chip and the active region of the laser. Although in currently preferred embodiments the laser is placed such that the active area is adjacent to the substrate, this is not necessarily so. If the laser active area is near the top side of the laser, then it may be necessary that the bonding area be recessed, such that the active area can be aligned with the waveguide.

As will be appreciated by those skilled in the art, the inventive technique has broad applicability. It is not limited to aligning a laser with a planar waveguide but can be used to align any device that can be caused to emit radiation from a defined region of the device by means of optical pumping. Among such devices are light emitting diodes, optical amplifiers, and detectors that can be caused to photoluminesce, provided they comprise a feature or features that permit the introduction of pump radiation into the semiconductor portion of the device while the device is in coupling relationship with the fixed waveguide. Typically the feature comprises a window (transmissive region) in a metallization layer. Broadly speaking, the method can be used in principle to align any device capable of photoluminescence with any fixed counterpart, although in currently preferred embodiments the method is used to align a light emitting device with an optical waveguide (e.g., a planar waveguide or an optical fiber in fixed position).

Figure 3:
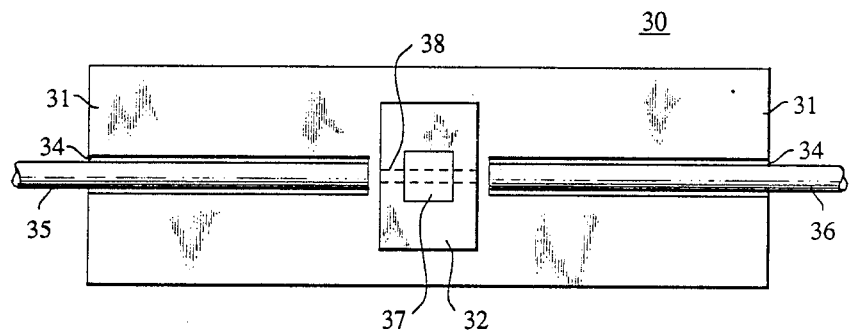
FIG. 3 schematically shows part of an optical fiber communication system comprising an optical amplifier made according to the invention.

Exemplary of the use of the technique to align devices other than a laser is the alignment of an in-line optical amplifier, schematically depicted in FIG. 3. Amplifier 30 comprises a substrate 31 and, electrically connected and mechanically secured to 31, a semiconductor optical amplifier 32. The substrate comprises coaxial V-grooves 34. The V-grooves serve to align optical fibers 35 and 36. The fibers are placed into the respective V-grooves and secured to the substrate by appropriate means, e.g., by means of epoxy or other adhesive. After initial placement of the amplifier 32 between the ends of 35 and 36 the amplifier is optically pumped through window 37. At least some of the radiation emitted from active region 38 of 32 is coupled into the optical fibers and detected by appropriate means (not shown). The position of 32 is then adjusted until the detector signals indicate that the desired degree of optical coupling between the amplifier and both optical fibers is attained, and the amplifier is then secured to and electrically connected with the substrate, electrical connections are established with the substrate, and the assembly is encapsulated. Exemplarily, such an assembly can be used in an optical fiber communication system.

EXAMPLE

A laser is aligned with a thin film optical waveguide (of the previously referred to type) on a Si substrate and attached to the substrate substantially as outlined in FIG. 2. The bonding area of the Si substrate is configured substantially as depicted in FIG. 4, and the substrate carries a straight section of a single mode waveguide, with the core of the waveguide having a diameter of about 6 $\mu$m, the center of the core being about 4 $\mu$m above the top surface of ridges 151 (of FIG. 4). The ridges have a height of about 5 $\mu$m, with the metalized recess therebetween being about 200 $\mu$m wide. The laser is an InGaAsP buried heterojunction laser having an exposed gold metallization layer on the up/substrate side, with a 75 $\mu$m wide opening in the metallization layer to form a window. The bottom/epitaxial side is prepared for solder bump bonding in a conventional manner, the solder material being eutectic lead/tin. The laser chip is picked up with a vacuum collet and placed onto the bonding area. Infrared radiation from a conventional Q-switched Nd:YAG laser (1.06 $\mu$m) is guided by means of a 600 $\mu$m core silica multimode fiber to the alignment apparatus and focused by standard means to a 150 $\mu$m sot size, with the radiation directed into the window of the laser chip. The YAG laser repetition rate is about 100 kHz, and the average power is about 1W. The pump radiation causes lasing of the chip, some of the semiconductor laser output being coupled into the planar waveguide. A standard single mode optical fiber with cleaved end is positioned by means of a conventional xyz-positioner to receive radiation from the planar waveguide and to guide it to a 1.06 $\mu$m filter followed by a power meter. The position of the laser chip relative to the core of the planar waveguide is changed by means of a positioner (Newport Research Corporation) stage with a closed loop feedback piezoelectric transducer until the power meter indicates maximum coupling. The laser chip is maintained in this position with the vacuum collet while the temperature of the substrate is raised to about 200° C. by means of a conventional heating stage, resulting in solder flow. After permitting the substrate to cool to room temperature the power meter still indicates maximum coupling. Conventional tests indicate that the laser chip is mechanically secured to, and in electrical contact with, the Si substrate.

What is claimed is:

1. A method of manufacturing an article comprising a substrate, with an opto-electronic device and an optical waveguide on the substrate, the method comprising
   (a) securing the device to the substrate such that the device and the waveguide are in a relative position adapted for coupling radiation from the device into the waveguide and/or from the waveguide into the device; and
   (b) providing means for making electrical contact to the device;
   characterized in that the device is capable of photoluminescence, and in that the method further comprises
   (c) exposing, prior to a) and prior to completing electrical contact between the opto-electronic device and the substrate, the device to pump radiation such that the device is caused to emit electromagnetic radiation by photoluminescence; and
   (d) detecting at least some of the radiation emitted by the device and
   (e) adjusting the relative position of the device and the waveguide such that a desired degree of optical coupling between the device and the waveguide results.

2. Method of claim 1, wherein the substrate comprises a Si body and the optical waveguide is a planar waveguide formed on the Si body.

3. Method of claim 2, comprising providing on the substrate means for detecting the radiation emitted by the device and coupled into the waveguide.

4. Method of claim 2, wherein the opto-electronic device is a semiconductor laser, and wherein the article further comprises an optical fiber attached to the Si body in coupling relationship with the planar waveguide.

5. Method of claim 1, wherein the substrate comprises a Si body and the optical waveguide is an optical fiber attached to the Si body.

6. Method of claim 1, wherein the opto-electronic device is a semiconductor laser, a semiconductor light emitting diode, a semiconductor optical amplifier, or a semiconductor radiation detector.

7. An article comprising a substrate, with an opto-electronic device and an optical waveguide on the substrate, the device comprising a semiconductor body and at least one metallization layer at least partly covering a major surface of the semiconductor body,
   characterized in that
   (a) the device is mounted on the substrate in a position adapted for coupling radiation from the device into the waveguide and/or from the waveguide into the device; and
   (b) the metallization layer comprises a window such that pump radiation can be transmitted into the semiconductor body, whereby the device can be caused to emit radiation by photoluminescence, with at least some of the radiation coupled into the waveguide.

* * * * *